(12) United States Patent
Kaidi

(10) Patent No.: US 11,611,585 B2
(45) Date of Patent: Mar. 21, 2023

(54) DETECTION OF PRIVILEGE ESCALATION ATTEMPTS WITHIN A COMPUTER NETWORK

(71) Applicant: PayPal, Inc., San Jose, CA (US)

(72) Inventor: George Chen Kaidi, Singapore (SG)

(73) Assignee: PayPal, Inc., San Jose, CA (US)

( * ) Notice: Subject to any disclaimer, the term of this patent is extended or adjusted under 35 U.S.C. 154(b) by 275 days.

(21) Appl. No.: 16/918,331

(22) Filed: Jul. 1, 2020

(65) Prior Publication Data

US 2022/0006834 A1 Jan. 6, 2022

(51) Int. Cl.
| | |
|---|---|
| *H04L 9/40* | (2022.01) |
| *G06F 8/71* | (2018.01) |
| *G06N 20/00* | (2019.01) |
| *G06N 5/04* | (2023.01) |
| *G06F 8/60* | (2018.01) |

(52) U.S. Cl.
CPC ............ *H04L 63/1491* (2013.01); *G06F 8/71* (2013.01); *G06N 5/04* (2013.01); *G06N 20/00* (2019.01); *H04L 63/1425* (2013.01); *G06F 8/60* (2013.01)

(58) Field of Classification Search
CPC . H04L 63/1491; H04L 63/1425; G06N 20/00; G06N 5/04; G06F 8/71; G06F 8/60
See application file for complete search history.

(56) References Cited

U.S. PATENT DOCUMENTS

| | | | |
|---|---|---|---|
| 8,539,569 B2 | 9/2013 | Mansour | |
| 9,445,353 B2 * | 9/2016 | Ullah | H04W 36/14 |
| 9,734,496 B2 | 8/2017 | Nahari | |
| 10,470,008 B2 * | 11/2019 | Arunachalam | G01S 1/68 |
| 10,694,336 B2 * | 6/2020 | Arunachalam | H04W 4/38 |
| 11,204,156 B2 * | 12/2021 | Stegeman | H05B 47/19 |
| 2005/0144071 A1 | 6/2005 | Monahan et al. | |
| 2016/0171486 A1 * | 6/2016 | Wagner | G06Q 20/326 705/39 |
| 2016/0241574 A1 * | 8/2016 | Kumar | H04L 63/12 |
| 2016/0373909 A1 * | 12/2016 | Rasmussen | H04W 4/80 |
| 2017/0374071 A1 * | 12/2017 | Visuri | H04L 63/101 |

* cited by examiner

*Primary Examiner* — Hosuk Song
(74) *Attorney, Agent, or Firm* — Kowert, Hood, Munyon, Rankin & Goetzel, P.C.; Catherine L. Gerhardt; Dean M. Munyon

(57) ABSTRACT

Techniques are disclosed relating to computer network security. In some embodiments, a computing system generates a plurality of executable binaries that include alerting beacons for a computer network associated with a transaction service. The computing system then deploys, within the computer network, the plurality of executable binaries as traps to detect privilege escalation attempts within the computer network. In some embodiments, the computing system detects that one or more alerting beacons included in the plurality of executable binaries have been triggered. In response to the detecting, the computing system may transmit, to a security management system, a notification indicating the one or more triggered alerting beacons. The disclosed detection techniques may advantageously reduce breaches in network security, which in turn may reduce or prevent the loss of private data.

20 Claims, 6 Drawing Sheets

Method 400 

Generate a plurality of executable binaries that include alerting beacons for a computer network associated with a transaction service.
410

Deploy, within the computer network, the plurality of executable binaries as traps to detect privilege escalation attempts within the computer network.
420

Detect that one or more alerting beacons included in the plurality of executable binaries have been triggered.
430

In response to the detecting, transmit, to a security management system, a notification indicating the one or more triggered alerting beacons.
440

Fig. 4

Method 500 

Receive a notification that one or more alerting beacons included in a plurality of executable binaries have been triggered, where the alerting beacons are for a computer network associated with a transaction service and respective ones of the plurality of executable binaries include fake fingerprints that identify vulnerable resources of the computer network that are usable as part of a privilege escalation attack.
510

Perform, based on the receiving, a set of preventative actions, where the performing is done without notifying a user that triggered the one or more alerting beacons.
520

*Fig. 5*

DETECTION OF PRIVILEGE ESCALATION ATTEMPTS WITHIN A COMPUTER NETWORK

BACKGROUND

Technical Field

This disclosure relates generally to computer networks, and, more specifically, to techniques for detecting privilege escalation attempts using executable binaries with alerting beacons.

Description of the Related Art

Security breaches in computer networks are becoming increasingly common. Unfortunately, they are difficult to detect, and are frequently quite costly to the breached entity. For example, during a security breach, private data may be exfiltrated. In other situations, an attacker may sabotage the computer network or attempt to ransom stolen data, for example. In many situations, techniques used to detect security breaches are often limited in scope or noisy (e.g., the detection techniques produce false positives). In addition, such techniques are often slow. For example, it is common in today's environment to take upwards of 200 days to detect a breach.

BRIEF DESCRIPTION OF THE DRAWINGS

FIG. 4 is a flow diagram illustrating a method for transmitting notifications to a security management system based on detecting that one or more alerting beacons deployed within a computer network have been triggered, according to some embodiments.

FIG. 5 is a flow diagram illustrating a method for performing a set of preventative actions based on receiving a notification that one or more alerting beacons within a computer network have been triggered, according to some embodiments.

Figure 1:
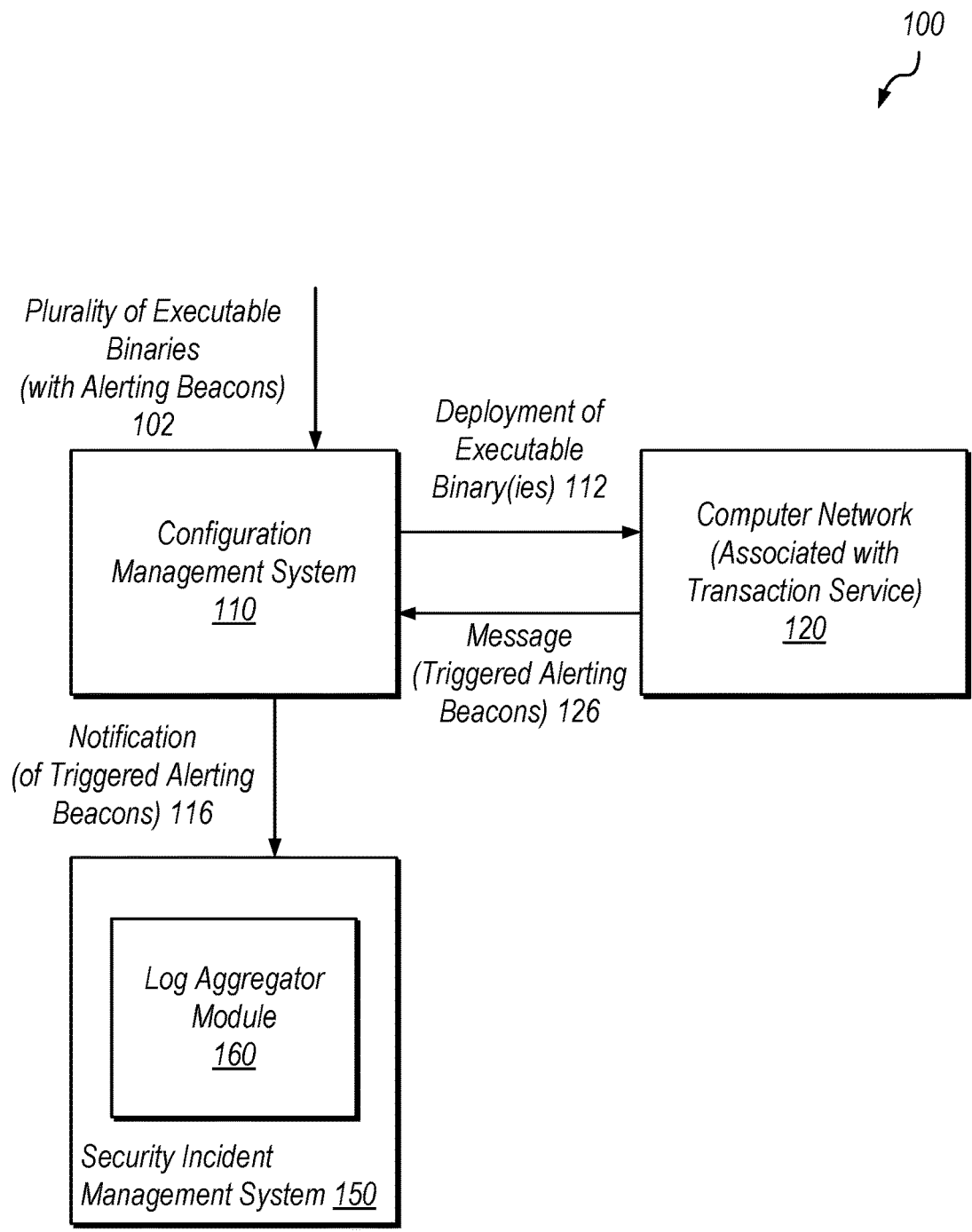
FIG. 1 is a block diagram illustrating an example system configured to detect suspicious activity in a computer network using executable binaries with alerting beacons, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "configuration management system configured to deploy one or more executable binaries" is intended to cover, for example, a computer system that performs this function during operation, even if it is not currently being used (e.g., when its power supply is not connected). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile computing device, for example, would not be considered to be "configured to" perform some specific function, although it may be "configurable to" perform that function. After appropriate programming, the mobile computing device may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a computing system having multiple user accounts, the terms "first" and "second" user accounts can be used to refer to any users. In other words, the "first" and "second" user accounts are not limited to the initial two created user accounts, for example.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of options. This phrase is not to be interpreted to require that there is at least one instance of w, at least one instance of x, at least one instance of y, and at least one instance of z.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor and is used to determine A or affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, a "module" refers to software and/or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC. Accordingly, a module that is described as being "executable" to perform operations refers to a software module, while a module that is described as being "configured" to perform operations refers to a hardware module. A module that is described as operable to perform operations refers to both a software module, a hardware module, or some combination thereof. Further, for any discussion herein that refers to a module that is "executable" to perform certain operations, it is to be understood that those operations may be implemented, in other embodiments, by a hardware module "configured" to perform the operations, and vice versa.

DETAILED DESCRIPTION

Techniques are disclosed for detecting privilege escalation attempts within a computer network by users (or "attackers") after such attackers have gained access to the computer network. For example, after a breach of a computer network, the attacker's behavior often follows a pattern of attempting to escalate from a non-privileged user account to a root or administrative account in order to gain access to various system resources or sensitive information. In many situations, an attackers behavior proceeds according to the following pattern: perform discovery of existing network permissions, enumerate for additional information about the host of the computer network, enumerate vulnerable resources of the computer network (e.g., attempt to escalate privileges by executing one or more identified computer resources), steal private data from the computer network, and so on. In general, attackers may be seeking to exploit vulnerable resources—that is, resources having exploitable security gaps. Security gaps may be due to insecure coding, unpatched systems, or various other flaws.

As noted, security breaches are often expensive. The present disclosure describes a proactive approach for monitoring suspicious network activity using "traps" in the form of fake executable binaries. These binaries are strategically placed in locations that attackers are likely to discover or access, or both, during enumeration scans of the computer network. Significantly, these binaries may include alerting beacons that can serve as an "early warning system" for system breaches. As used herein, the term "executable binary" is intended to be construed according to its well-understood meaning, which includes a collection of instruction set architecture (ISA) instructions output by a compiler. These instructions include a sequence of bits that are machine-readable (e.g., are understandable by a processor that will execute this program code), but may not be human-readable. Such instructions, when executed, may cause a computer to perform one or more tasks according to the encoded instructions. An executable binary may be (or may be included in) one or more of the following computer resources: package, service, kernel, configuration, file, etc.

Specifically, the disclosed techniques include generation of various executable binaries that include alerting beacons for a computer network associated with a transaction service. The executable binaries carry fake fingerprints that identify vulnerable resources of the computer network that may be usable as part of privilege escalation attempts. Such fingerprints are referred to as "fake" because they identify computer resources that look like actual computer resources, but which in fact are merely functioning as alerting mechanisms and do not perform the expected functions of the actual computer resources. An executable binary that includes a fake fingerprint may be referred to as a dummy resource or a trap. Alerts received from the alerting beacons are usable to identify privilege escalation attempts (e.g., by attackers) within the computer network.

The transaction service with which the computer network is associated may facilitate transactions between various systems or users, for example. PAYPAL is one specific example of a transaction service, e.g., for facilitating electronic monetary transactions between to merchants and consumers. Note that a transaction service may be any computer system that facilitates performance of transactions. Computer network 120 shown in FIG. 1, for example, may be a network that includes various PAYPAL servers.

Executable binaries may be deployed within the computer network as traps for detecting privilege escalation attempts. The disclosed techniques detect when various alerting beacons have been triggered and, in response to the detecting, transmit a notification indicating the triggering to a security management system. The security management system may then perform a set of preventative actions without notifying a user that triggered the various alerting beacons.

In some situations, the disclosed techniques may improve computer network security. For instance, the disclosed techniques may detect malicious activity within a computer network earlier, by alerting on network activity that is commonly associated with attacks and increasing logging of user activity based on such alerts. In addition, the disclosed system may increase logging of user activity without letting the suspicious user know that the security system suspects malicious activity. For example, although the disclosed system may block data exfiltration for the suspicious user (e.g., by blocking file transfers for their IP address), this user will still have access to the computer network and may be unaware of the blocking. Because they are unaware of the blocking, this user may continue with their attack, allowing the disclosed system to track and record their activity in order to present the activity as evidence for law enforcement, for example. In addition, the disclosed system may use the recorded activity to train future generations of security models to detect malicious computer network activity.

Example Security Management System

FIG. 1 is a block diagram illustrating an example system configured to secure a computer network using executable binaries with alerting beacons. In the illustrated embodiment, system 100 includes a configuration management system 110, a computer network 120 associated with a transaction service, and a security incident management system 150. System 100 may be referred to as a security management system that handles deployment of traps, detection using the traps, and prevention of security breaches.

Configuration management system 110, in the illustrated embodiment, generates a plurality of executable binaries 102 with alerting beacons. After generating the executable binaries 102, configuration management system 110 evaluates computer network 120 and deploys one or more of these binaries within the network based on the evaluation. The evaluation of network 120 may include a determination of the number of servers included in the network as well as the types of operating systems running on these servers. Configuration management system 110 may be a software configuration management tool such as the PUPPET, CHEF, ANSIBLE, etc. configuration tools. Deployment 112 of one or more executable binaries may include placing the binaries in various locations within computer network 120 such that they are likely to be identified or returned, or both, as part of an enumeration scan during a privilege escalation attempt. A privilege escalation attempt may be referred to as a privilege escalation attack.

Computer network 120, in the illustrated embodiment, sends a message 126 to configuration management system 110 indicating that one or more alerting beacons have been triggered within the network. Configuration management system 110 then sends notification 116 to security incident management system 150 indicating the one or more beacons that have been triggered. In some embodiments, configuration management system 110 actively tracks alerting beacons included in one or more executable binaries deployed in network 120. Based on detecting that at least one alerting beacons has triggered, system 110 then transmits notification 116 to security incident management system 150.

Log aggregator module 160 accumulates various alerts received for suspicious activity on computer network 120. Specifically, configuration management system 110 may monitor execution of discovery commands within network 120 in addition to monitoring deployed executable binaries. Based on detecting that one or more discovery command have been executed in network 120, system 110 sends a notification to log aggregator module 160. For example, this additional notification may specify one or more discovery commands executed by a user within network 120.

As used herein, the term "discovery command" refers to a command that is executable by a computer within a computer network to collect information about various computer resources within the computer network. Such discovery commands may also be referred to as commands for enumeration. For example, a discovery command may include one or more of the following: whoami, id, uname, /etc/passwd, and sudo. Discovery commands are often executed by attackers attempting to gather additional information about a computer network in order to penetrate the network's defenses. Consequently, execution of such commands may be expected behavior for an attacker. As such, system 110 may alert log aggregator module 160 of such activity. Based on message 126 and various logged user activity received for network 120, log aggregator module 160 may generate a suspiciousness report for a given user of the network. This suspiciousness report may be used by security incident management system 150 to perform a set of preventative actions within network 120, as discussed in further detail below with reference to FIG. 3.

In some embodiments, configuration management system 110 maintains one or more executable binaries deployed within network 120. For example, based on detecting that an alerting beacon has been triggered, system 110 may remove the executable binary that includes this beacon from deployment within network 120. In some situations, system 110 may then deploy one or more additional executable binaries (e.g., that are different than the binary whose beacon was triggered) within network 120.

In some embodiments, configuration management system 110 whitelists one or more executable binaries deployed within computer network 120. For example, this may prevent internal vulnerability scanners of the network from generating false positive alerts. In addition, to protect executable binaries from reverse engineering, system 110 may encrypt these binaries using cryptographic techniques or may place data-loss prevention (DLP) rules on one or more servers of computer network 120 to prevent any transfer of these executable binaries outside of the network. Alerts may be transmitted in response to such attempts, for example. In some situations, protection of executable binaries may include employment of various obfuscation techniques, encryption techniques (using hardware or software, or both), etc. when coding and compiling these traps.

In some embodiments, executable binaries 102 received at system 110 are automatically generated by a server associated with the computer network. In other embodiments, the executable binaries are generated by a developer such as a system administrator, for example. Development of the executable binaries may include generating one or more "fake" computer resources that mimic commonly vulnerable resources of computer network 120. In order to mimic vulnerable resources, an executable binary generated by system 110 may include fake fingerprints that identify one or more computer resources (which may include services) that appear vulnerable to an attacker. When these resources are executed by an attacker, however, they will simply send an alert to configuration management system 110 and will not function as the attacker expected. For example, a fake fingerprint included in an executable binary identifies a file associated with a type of permission that allows users to execute this file with elevated access rights. Consider a situation in which system 110 plants a fake executable binary named "copy" (which may be usable to copy information) into "/bin/root/cp" with a set of user ID permissions (e.g., SUID) to mimic the regular "Thin/copy" of network 120. This fake binary is likely to be picked up by a malicious user during an enumeration scan and, upon execution, this "vulnerable" file will not work as expected (e.g., by the malicious user) because it is simply a mimic of the real vulnerable file. Example executable binaries including fake fingerprints are discussed in further detail below with reference to FIG. 2.

In some embodiments, configuration management system 110 includes a training module configured to train a machine learning module to predict whether a user of computer network 120 is malicious. For example, system 110 may log, prior to one or more alerting beacons being triggered, activity of one or more users relative to computer network 120. In addition to user activity on the network (e.g., which files users are accessing), this logged activity may include information corresponding to a device that triggered the alerting beacons, such as identification information of the device (e.g., hardware specifications, software specifications, IP address, etc.). In some situations, the logged activity includes identification information of the user operating the device (e.g., user account information). System 110 may perform a pattern analysis of the logged activity. Based on the results of the pattern analysis, system 110 generates training data (e.g., various labeled user activity) and trains a machine learning module.

Once trained, the machine learning module may be usable to predict whether activity of users within network 120 is malicious. The machine learning module trained by system 110 may be a classifier, for example. Specifically, system 110 may receive one or more new activity logs. These logs may include activity for various different users within network 120. System 110 then analyzes the logs using the trained machine learning module and identifies whether to trigger a silent alarm on one or more users. In some embodiments, system 110 uses the trained machine learning module to predict one or more preventative measures to perform in response to deciding to trigger a silent alarm. For example, the trained machine learning module may be used to predict a set of preventative actions to perform in response to identifying malicious activity in the network 120. Such preventative actions are discussed in detail below with reference to FIG. 3.

In other embodiments, configuration management system 110 includes a machine learning module that is trained based on user activity that is logged after one or more alerting beacons are triggered within computer network 120. For example, configuration management system 110 may log activity of various users relative to computer network 120 based on detecting that one or more alerting beacons have been triggered. System 110 may use this logged activity to train a machine learning module. Note that training after triggering of an alerting beacon may allow system 110 to perform real-time training (e.g., training using activity that is being recorded nearly simultaneously with the training). Such real-time training may improve the accuracy of the trained machine learning module in predicting malicious activity relative to a machine learning module that is trained on user activity recorded prior to the triggering. Machine learning techniques used to train the module may include one or more of the following: Logistic Regression, Naïve Bayes, K-Nearest Neighbors, Decision Tree, etc. In some situations, the machine learning module is trained using semi-supervised techniques with some amount of input or supervision provided by a developer or system administrator. Consider a situation where a system administrator evaluates whether a given user is malicious based on comparing the number of alerting beacons triggered by this user with an alerting threshold. The determination made by the system administrator may be provided as feedback to the machine learning module, for example.

The disclosed techniques for detecting suspicious activity on a computer network may advantageously identify malicious users earlier, which in turn may reduce or prevent breaches in network security and, ultimately, loss of private data. In addition, the disclosed techniques allow for collection of activity information for potentially malicious users without alerting these users. This may advantageously avoid the situation where an attacker speeds up their discovery techniques or deletes their activity (which may cause a denial-of-service) prior to the collection of such information. The activity information collected by the disclosed system may advantageously assist in preventing future attacks, for example, by providing training data (e.g., for machine learning) or for law enforcement, or both. In some situations, the disclosed techniques assist in distinguishing between malicious privileged escalation and legitimate privilege escalation (by a trusted user). In addition to identifying malicious activity, the disclosed techniques may advantageously limit the exposure of a computer network by limiting access of certain compromised servers to the network.

Example Configuration Management System

Figure 2:
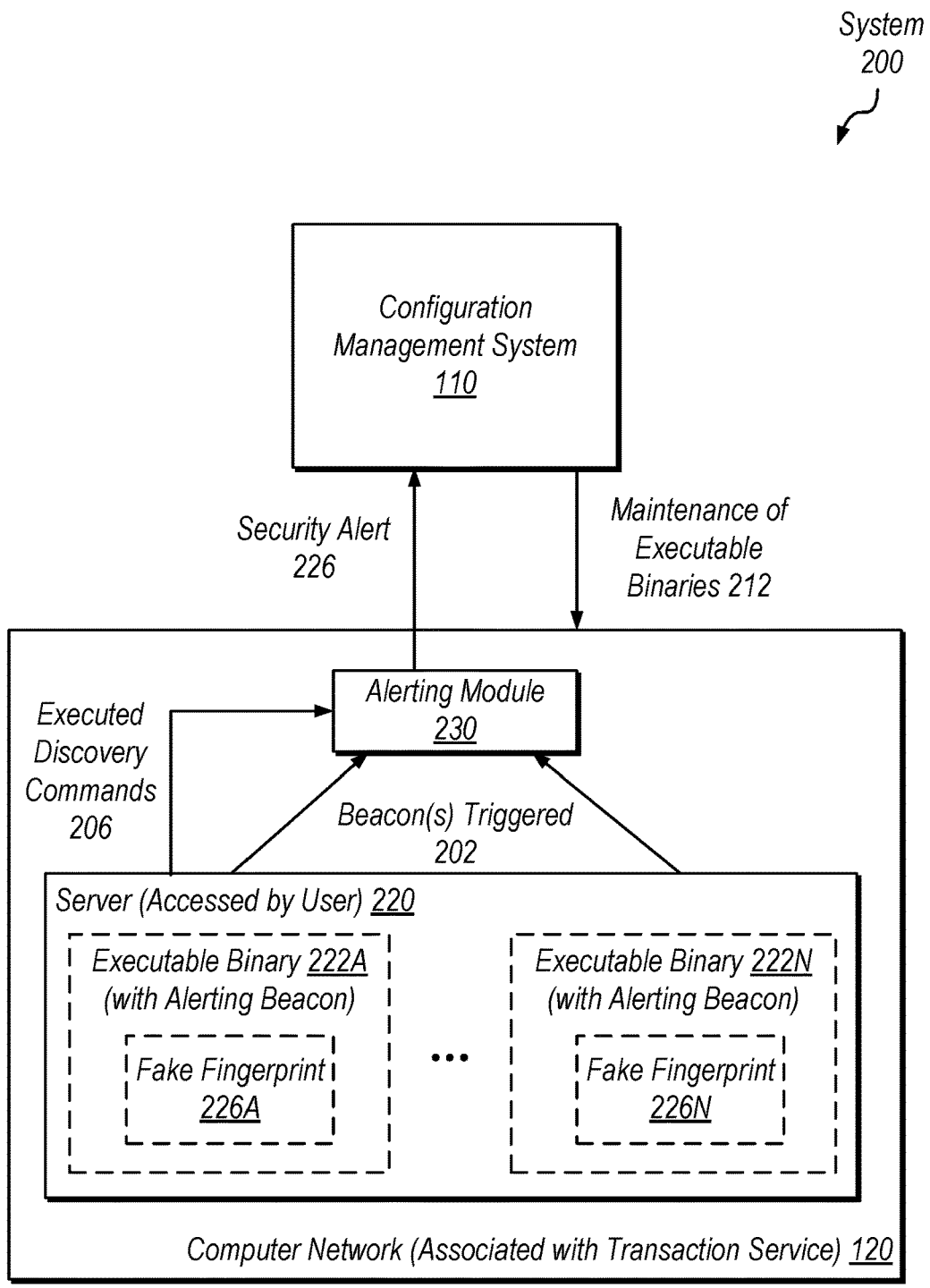
FIG. 2 is a diagram illustrating an example configuration management system, according to some embodiments.

FIG. 2 is a diagram illustrating a software configuration system. In the illustrated embodiment, system 200 includes configuration management system 110 and computer network 120, which in turn includes server 220 and alerting module 230.

Configuration management system 110, in the illustrated embodiment, is configured to perform maintenance 212 of various executable binaries within computer network 120. This may include, for example, removing or deploying (or both) one or more executable binaries for network 120.

Computer network 120 is configured to transmit a security alert 226 to system 110 via alerting module 230. Alerting module 230, in the illustrated embodiment, monitors user activity at server 220 and, based on this activity, sends an alert to system 110. For example, alerting module 230 may receive a notification 202 that one or more alerting beacons have been triggered and a notification 206 that one or more discovery commands have been executed. Alerting module 230 may bundle the information indicated in these notifications and provide this information to system 110 via a security alert 226.

Server 220, in the illustrated embodiment, includes various executable binaries 222A-222N with fake fingerprints 226A-226N. Note that computer network 120 may include various different servers other than server 220, but that a single server is provided in FIG. 2 for visibility purposes. Executable binaries 222 include fake fingerprints 226 that identify one or more of the following computer resources: a service, a package, a kernel, a configuration, a file, etc. Configuration management system 110 generates these executable binaries 222 such that they resemble "real" resources of the computer network 120 by padding them to the same file size as these real resources, placing them in the same directories as the real resources, and spoofing their fingerprints and banners, for example.

As used herein, the term "service" refers to a program that runs in the background of a computer system such that it is outside of the interactive control of system users. For example, these users may lack interactive control due to the service being without an interface. This lack of interface may improve security of the service. In some computing environments, a service may be referred to as a daemon. Note that, in the context of the present disclosure, the term "service" stands in distinction to the term "transaction service" which refers to a customer-facing service on the Internet such as PAYPAL, for example. As used herein, the term "package" is intended to be construed according to its well-understood meaning, which includes a compressed file archive with both files and metadata for a particular application. For example, a LINUX package may be a .deb, .rpm, .tgz, etc. Although various examples are described herein in the context of LINUX, note that the disclosed security techniques may be applied in any of various operating systems.

The term "kernel," in the context of the present disclosure, is intended to refer to its well-understood meaning, which includes a computer program at the core of a computing device's operating system that has complete control of the resources of the computing device. "Configuration" is also intended to be construed according to its well-understood meaning, which includes various settings applied to a computer program. Improper configuration of a computer program may result in vulnerabilities, for example. In some situations, an executable binary is a computer file.

The fake fingerprints 226A-226N included in executable binaries 222A-222N allow these binaries to mimic actual computer resources such that users of network 120 would not know that these are traps set by the disclosed system in order to catch attackers. As one specific example, a fake fingerprint 226 may identify a common vulnerable service that spoofs enumeration banner grabbing (e.g., for collection of metadata about the service) to increase the take-up rate.

Banner grabbing may be performed by an attacker in order to gain information about one or more servers in network 120. That is, this service may be placed in a location such that an attacker will be likely to see it when they perform banner grabbing. For example, this service would show up in the results of an enumeration performed by the attacker. Such enumeration may be performed, for instance, by running TELNET, CURL, NETCAT, or any of various custom enumeration scripts. If a user attempts to exploit this vulnerable service, then an alerting beacon placed within this service would trigger.

Consider an example where a fake fingerprint 226 of an executable binary 222 identifies one or more fake misconfigurations. For example, a fingerprint may identify misconfigured sudo rights. An attacker may attempt to exploit a service associated with misconfigured access privileges in order to run this service without providing credentials associated with an account that has higher access privileges than the account of the attacker. These fake misconfigurations are in fact not vulnerable as they do not run their spoofed capabilities when executed, but rather trigger an alerting beacon.

As yet another example, a fake fingerprint 226 may lure an attacker to attempt a local privilege escalation exploit by mimicking a common vulnerable executable file such as Exim 4.87-4.91. Attackers may attempt to exploit such files in order to gain elevated access privileges. It is unlikely that a user that is not an attacker would attempt to launch an exploit on such a file and, as such, users exploiting such files are likely to be malicious. Other examples of vulnerable computer resources that may be mimicked by fake executable binaries include various security protection services e.g., provided by antivirus companies that may include privilege escalation vulnerabilities.

Example Security Incident Management System

Figure 3:
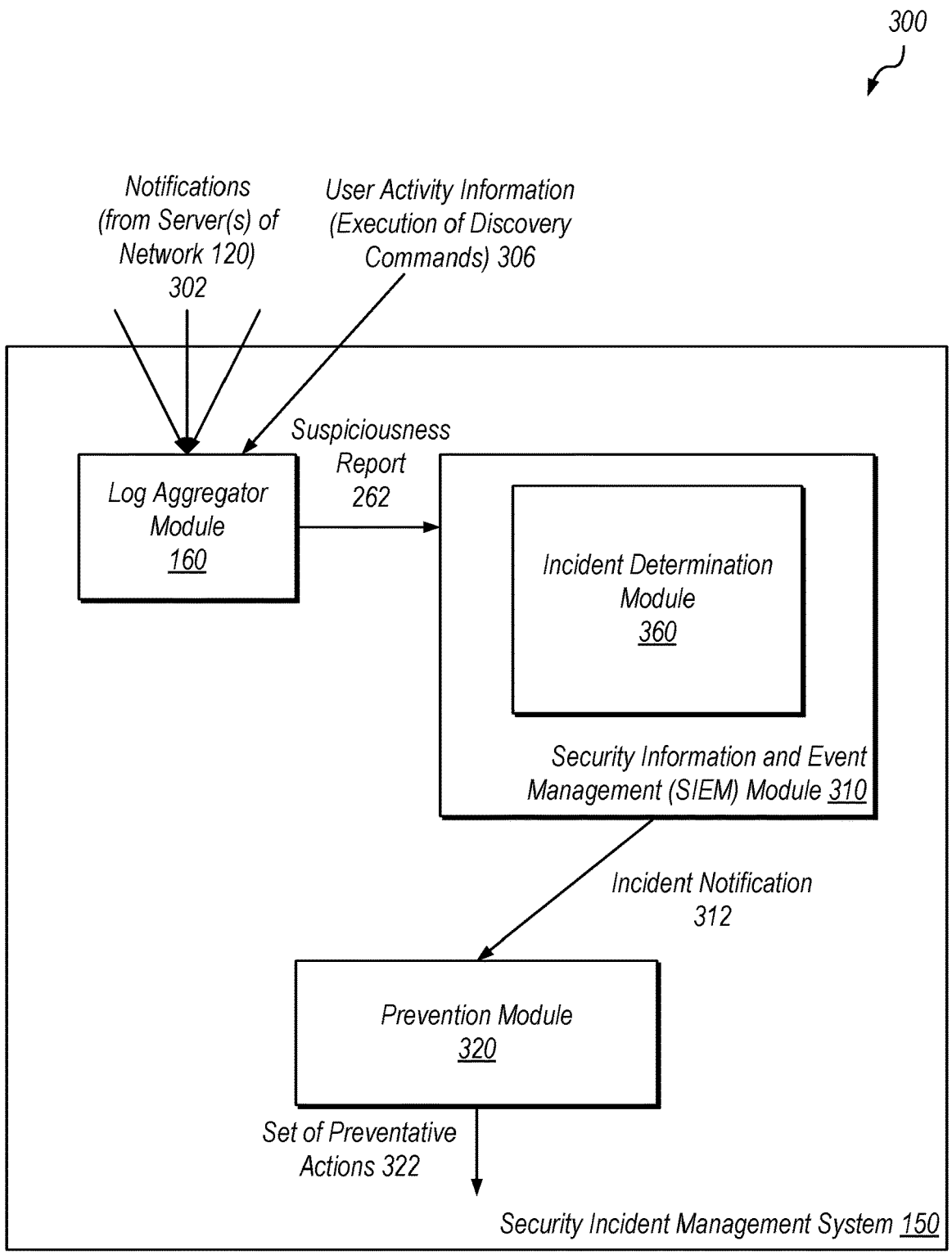
FIG. 3 is a block diagram illustrating an example security incident management system, according to some embodiments.

FIG. 3 is a block diagram illustrating an example security incident management system. In the illustrated embodiment, system 300 includes security incident management system 150, which in turn includes log aggregator module 160, security information and event management (SIEM) module 310, and prevention module 320.

Log aggregator module 160, in the illustrated embodiment, receives notifications 302 for one or more servers of computer network 120. These notifications may indicate various executable binaries that have been triggered within different servers of network 120, for example. In addition, log aggregator module 160 receives user activity information 306 from configuration management system 110. The user activity information may specify discovery commands executed by different users within network 120. As discussed above with reference to FIG. 1, log aggregator module 160 generates a suspiciousness report 262 and transmits the report to SIEM module 310. This report may indicate which alerting beacons and discovery commands were executed by various users of network 120. For example, this report may indicate a total number of alerting beacons that were triggered by a particular user as well as the types of executable binaries in which these alerting beacons were included. Log aggregator module 160 may generate individual suspiciousness reports 262 for respective users of network 120.

SIEM module 310 includes an incident determination module 360. One example of SIEM module 310 is SPLUNK. SIEM module 310 receives suspiciousness report 262 from log aggregator module 160. The report specifies a number of alerting beacons that were triggered as well as a number of discovery command executed by a particular user. Based on the information specified in the suspiciousness report 262, incident determination module 360 may determine that a user is malicious. Specifically, module 360 may include a set of rules for evaluating whether a user's activity satisfies a suspiciousness threshold. For example, if the suspiciousness report 262 and information 306 for the particular user indicate that the user triggered an alerting beacon and executed two different discovery commands, then a suspiciousness threshold may be satisfied. If a user's activity satisfies a suspiciousness threshold, then SIEM module 310 considers this user malicious and transmits an incident notification 312 to module 320. Logging of discovery command execution by different users may advantageously assist security incident management system 150 in ruling out false positives as well as obtaining additional context for potentially malicious network activity.

In some embodiments, incident determination module 360 includes risk scoring rules for determining whether activity within computer network 120 is suspicious. The risk scoring rules may assist in determining false positives, for example. If two different alerting beacons are triggered within network 120, with one being associated with three risk points and the other being associated with one risk point, then a risk threshold of four would be met and module 310 would generate a security incident and send it to the queue of a security team for triage. Similarly, if a single alerting beacon is triggered and this beacon is associated with a risk score of two, module 310 does not generate a security incident. SIEM module 310 may, however, maintain a dashboard of risk indicators for servers in real-time. For example, the risk score of two would be attributed to the particular server, even though a security incident has not (yet) been generated for this server. As such, SIEM module 310 may keep track of real-time risk scores for various servers and these scores may ultimately result in a security incident when they meet a risk threshold.

Prevention module 320, in the illustrated embodiment, receives an incident notification 312 for a particular user and determines a set of preventative actions 322 for the particular user to be performed within computer network 120. Security incident management system 150 performs set of preventative actions 322 within computer network 120. This performance is done without notifying a user that triggered the one or more alerting beacons. For example, the set of preventative actions 322 may include blocking off important functions from one or more servers that the user is accessing such that certain traffic is not allowed on the server. In addition, the preventative actions 322 may limit connectivity of a server, e.g., by moving the compromised server to a different virtual local area network (VLAN). In this way, the attacker will no longer be able to steal sensitive data, but is still online (e.g., still has access to the server) so that the systems 110 and 150 can monitor activity of the attacker. Blocking certain functions of the server may include removing the server from computer network 120 while maintaining online access for the server. Because the server they are accessing remains online, the attacker may be unaware that the server has been removed from the network.

In some embodiments, performing set of preventative actions 322 includes blocking data exfiltration for the attacker without notifying the attacker. For example, attempts to transfer files may be blocked based on the attacker's session or IP address so that this user is prevented from transferring private data off of the server 220. In some embodiments, performing set of preventative actions 322 includes increasing logging activity of the attacker relative to computer network 120 by capturing a plurality of artifacts prior to the attacker clearing their activity history. For example, the artifacts may include evidence of the attacker's activity on the network, including: IP address, device fingerprint, specific exploits attempted by the attacker (e.g., which may indicate where the attacker is sending their stolen information), etc.

In some embodiments, system 150 performs set of preventative actions 322 by blocking an attacker from computer network 120. This blocking may be performed based on an amount of logged activity for the attackers satisfying an activity threshold. In some embodiments, system 150 performs set of preventative actions 322 by deleting one or more of the plurality of executable binaries. In some embodiments, system 150 performs set of preventative actions 322 by updating a plurality of credentials for the computer network 120 (e.g., such that users without access to these credentials are not able to access the network). For example, passwords for accessing the computer network may be updated.

In some embodiments, security incident management system 150 performs set of preventative actions 322 based on notifications 302 received from configuration management system 110 without performing an incident determination (via incident determination module 360). That is, system 150 may perform set of preventative actions 322 for a particular user within computer network 120 regardless of a suspiciousness threshold being satisfied. For example, even if the severity of a security threat is low (e.g., a security breach is unlikely because this user is likely not malicious), system 150 may perform a few security measures for preventing loss of private data within network 120.

Example Methods

FIG. 4 is a flow diagram illustrating a method for transmitting notifications to a security management system based on detecting that one or more alerting beacons deployed within a computer network have been triggered, according to some embodiments. The method shown in FIG. 4 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. The elements of FIG. 4 may be performed by configuration management system 110, for example.

At 410, in the illustrated embodiment, a computing system generates a plurality of executable binaries that include alerting beacons for a computer network associated with a transaction service. In some embodiments, the computing system facilitates generation of the plurality of executable binaries. For example, a system administrator may develop various executable binaries via an interface of the computing system. In other embodiments, the computing system automatically generates the plurality of executable binaries. For example, the computing system may evaluate prior executable binaries generated by a system administrator and then model new executable binaries based on this evaluation. In some situations, a developer may provide the base program code for an alerting beacon and the computing system may generate various different executable binaries based on the alerting beacon. As part of this process, the computing system may determine different fingerprints as well as obfuscation techniques for respective executable binaries. In some embodiments, the computing system is a software configuration management system and the alerting beacons notify a reporting module that one or more of the executable binaries have been accessed.

At 420, the computing system deploys, within the computer network, the plurality of executable binaries as traps to detect privilege escalation attempts within the computer network. In some embodiments, respective ones of the plurality of executable binaries include fake fingerprints that identify vulnerable resources of the computer network that are usable as part of a privilege escalation attack. In some embodiments, a fake fingerprint included in at least one of the plurality of executable binaries identifies a file associated with a type of permission that allows users to execute files with elevated access rights.

At 430, the computing system detects that one or more alerting beacons included in the plurality of executable binaries have been triggered. In some embodiments, prior to the detecting, the computing system logs activity of one or more users relative to the computer network and performs a pattern analysis of the logged activity. In some embodiments, the computing system trains, based on results of the pattern analysis, a machine learning module. In some embodiments, the trained machine learning module is usable to predict prior to an alerting beacon being triggered whether activity of one or more users is malicious.

At 440, in response to detecting, transmitting, by the computing system to a security management system, a notification indicating the one or more triggered alerting beacons. In some embodiments, the security management system performs, based on the notification, a set of preventative actions without notifying a user that triggered the one or more alerting beacons. In some embodiments, performing the set of preventative actions includes removing a server that is being accessed by the user from the computer network. In some embodiments, performing the set of preventative actions includes maintaining online access for the server, where the maintaining allows the computing system to monitor activity of the user on the server without notifying the user of the removing.

In some embodiments, the computing system trains a machine learning module based on logged activity of users relative to the computer network. The trained machine learning module may then be used to predict whether user activity within the network is malicious. In some situations, the computing system also trains the machine learning module based on a set of preventative actions performed due to detecting prior malicious activity. The machine learning module may then be usable to both identify malicious user activity and determine a set of preventative actions to be performed based on identifying the malicious user activity. For example, the trained machine learning module may determine a set of three actions to be performed for a first malicious user and a set of five, different preventative actions to be performed for a second malicious user. In some situations, the sets determined by the machine learning module for different users may include one or more of the same actions.

In some embodiments, the computing system maintains, based on the detecting, the plurality of executable binaries. In some embodiments, the maintaining includes removing at least one of the plurality of executable binaries from deployment within the computer network. In some embodiments, the maintaining includes deploying one or more additional executable binaries within the computer network, where the deploying includes placing the one or more additional executable binaries on a whitelist of the computer network.

In some embodiments, the computing system deploys more executable binaries during a first time interval than during a second time interval. For example, based on prior malicious activity, the computing system may identify a particular time of day or a particular day of the week in which more malicious activity occurs. Based on this determination, the computing system may deploy more traps in order to detect this activity. At other times of day, however, less malicious activity is expected and, consequently, the computing system deploys less traps in order to decrease the number of traps within the network (e.g., which may decrease the amount of maintenance necessary within the network). In some embodiments, the computing system uses a machine learning module trained based on prior user activity to predict locations within the computer network to deploy future executable binaries. For example, the user activity may indicate one or more computer resources within the network that are commonly accessed by users during privilege escalation attempts. In some situations, the computing system uses the trained machine learning module to predict a number of executable binaries to deploy within a particular location within the network.

FIG. 5 is a flow diagram illustrating a method for performing a set of preventative actions based on receiving a notification that one or more alerting beacons within a computer network have been triggered, according to some embodiments. The method shown in FIG. 5 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. The elements of FIG. 5 may be performed by security incident management system 150, for example.

At 510, in the illustrated embodiment, a computer system receives a notification that one or more alerting beacons included in a plurality of executable binaries have been triggered, where the alerting beacons are for a computer network associated with a transaction service. In some embodiments, respective ones of the plurality of executable binaries include fake fingerprints that identify vulnerable resources of the computer network that are usable as part of a privilege escalation attack. In some embodiments, a fake fingerprint included in at least one of the plurality of executable binaries identifies a file associated with a type of permission that allows users to execute files with elevated access rights.

In some embodiments, a fake fingerprint carried by at least one of the plurality of executable binaries identifies a service that is stored in a location that is accessed during one or more banner grabbing operations. In some embodiments, a fake fingerprint carried by at least one of the plurality of executable binaries identifies a service that is associated with misconfigured access privileges, where the service is executable by users that do not have access privileges of a root account.

At 520, the computer system performs, based on the receiving, a set of preventative actions, where the performing is done without notifying a user that triggered the one or more alerting beacons. In some embodiments, the notification indicates that at least two alerting beacons have been triggered. In some embodiments, performing the set of preventative actions includes: receiving activity information for the user and determining, based on the activity information and the at least two alerting beacons, that the two alerting beacons indicate malicious activity. In some embodiments, the activity information indicates execution of at least one of the following discovery commands: whoami, id, uname, /etc/passwd, and sudo.

In some embodiments, the computer system logs, based on the receiving, activity of the user relative to the computer network. In some embodiments, the computer system trains, based on the logged activity, a machine learning module, where the trained machine learning module is usable to detect malicious activity of one or more users within the computer network. In some embodiments, performing the set of preventative actions includes blocking data exfiltration for the user, wherein the blocking is performed without the notifying the user. In some embodiments, performing the set of preventative actions includes increasing logging of activity of the user relative to the computer network, wherein logging activity of the user is performed by capturing a plurality of artifacts prior to the user clearing their activity history.

In some embodiments, the computer system blocks the user from the computer network, where the blocking is performed based on an amount of logged user activity satisfying an activity threshold. In some embodiments, the computer system deletes one or more of the plurality of executable binaries and updates a plurality of credentials for the computer network.

Example Computing Device

Figure 6:
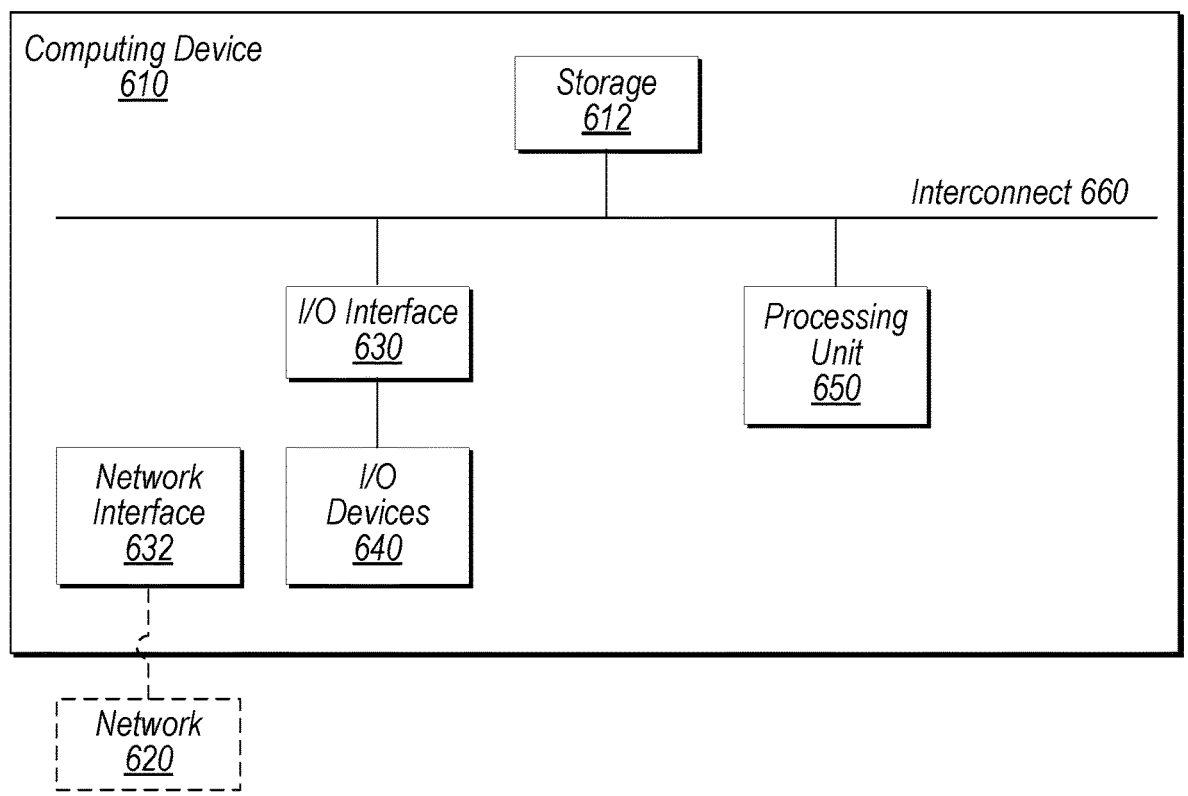
FIG. 6 is a block diagram illustrating an example computing device, according to some embodiments.

Turning now to FIG. 6, a block diagram of one embodiment of computing device (which may also be referred to as a computing system) 610 is depicted. Computing device 610 may be used to implement various portions of this disclosure. Computing device 610 may be any suitable type of device, including, but not limited to, a personal computer system, desktop computer, laptop or notebook computer, mainframe computer system, web server, workstation, or network computer. As shown, computing device 610 includes processing unit 650, storage 612, and input/output (I/O) interface 630 coupled via an interconnect 660 (e.g., a system bus). I/O interface 630 may be coupled to one or more I/O devices 640. Computing device 610 further includes network interface 632, which may be coupled to network 620 for communications with, for example, other computing devices.

In various embodiments, processing unit 650 includes one or more processors. In some embodiments, processing unit 650 includes one or more coprocessor units. In some embodiments, multiple instances of processing unit 650 may be coupled to interconnect 660. Processing unit 650 (or each processor within 650) may contain a cache or other form of on-board memory. In some embodiments, processing unit 650 may be implemented as a general-purpose processing unit, and in other embodiments it may be implemented as a special purpose processing unit (e.g., an ASIC). In general, computing device 610 is not limited to any particular type of processing unit or processor subsystem.

Storage subsystem 612 is usable by processing unit 650 (e.g., to store instructions executable by and data used by processing unit 650). Storage subsystem 612 may be implemented by any suitable type of physical memory media, including hard disk storage, floppy disk storage, removable disk storage, flash memory, random access memory (RAM—SRAM, EDO RAM, SDRAM, DDR SDRAM, RDRAM, etc.), ROM (PROM, EEPROM, etc.), and so on. Storage subsystem 612 may consist solely of volatile memory, in one embodiment. Storage subsystem 612 may store program instructions executable by computing device 610 using processing unit 650, including program instructions executable to cause computing device 610 to implement the various techniques disclosed herein.

I/O interface 630 may represent one or more interfaces and may be any of various types of interfaces configured to couple to and communicate with other devices, according to various embodiments. In one embodiment, I/O interface 630 is a bridge chip from a front-side to one or more back-side buses. I/O interface 630 may be coupled to one or more I/O devices 640 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   generating, by a computing system, a plurality of executable binaries that include alerting beacons for a computer network associated with a transaction service;
   deploying, by the computing system within the computer network, the plurality of executable binaries as traps to detect privilege escalation attempts within the computer network;
   detecting, by the computing system, that one or more alerting beacons included in the plurality of executable binaries have been triggered, wherein respective ones of the plurality of executable binaries include fake fingerprints that identify vulnerable resources of the computer network that are usable as part of a privilege escalation attack; and
   in response to the detecting, transmitting, by the computing system to a security management system, a notification indicating the one or more triggered alerting beacons.

2. The method of claim 1, wherein the computing system is a software configuration management system, and wherein the alerting beacons notify a reporting module that one or more of the executable binaries have been accessed.

3. The method of claim 1, further comprising:
   prior to the detecting, logging, by the computing system, activity of one or more users relative to the computer network;
   performing, by the computing system, a pattern analysis of the logged activity; and
   training, by the computing system based on results of the pattern analysis, a machine learning module, wherein the trained machine learning module is usable to predict prior to an alerting beacon being triggered whether activity of one or more users is malicious.

4. The method of claim 1, wherein the security management system performs, based on the notification, a set of preventative actions without notifying a user that triggered the one or more alerting beacons.

5. The method of claim 4, wherein performing the set of preventative actions includes:
   removing a server that is being accessed by the user from the computer network; and
   maintaining online access for the server, wherein the maintaining allows the computing system to monitor activity of the user on the server without notifying the user of the removing.

6. The method of claim 1, further comprising:
   maintaining, by the computing system based on the detecting, the plurality of executable binaries, wherein the maintaining includes:
      removing at least one of the plurality of executable binaries from deployment within the computer network; and
      deploying one or more additional executable binaries within the computer network, wherein the deploying includes placing the one or more additional executable binaries on a whitelist of the computer network.

7. The method of claim 1, wherein the transmitted notification indicates that at least two alerting beacons have been triggered, and wherein the method further comprises:
   receiving activity information for a user that triggered at least one of the alerting beacons; and
   determining, based on the activity information and the at least two alerting beacons, that the two alerting beacons indicate malicious activity.

8. The method of claim 6, wherein a fake fingerprint included in at least one of the plurality of executable binaries identifies a file associated with a type of permission that allows users to execute files with elevated access rights.

9. A method, comprising:
   receiving, by a computer system, a notification that one or more alerting beacons included in a plurality of executable binaries have been triggered, wherein the alerting beacons are for a computer network associated with a transaction service, and wherein respective ones of the plurality of executable binaries include fake fingerprints that identify vulnerable resources of the computer network that are usable as part of a privilege escalation attack; and
   performing, by the computer system based on the receiving, a set of preventative actions, wherein the performing is done without notifying a user that triggered the one or more alerting beacons.

10. The method of claim 9, wherein the notification indicates that at least two alerting beacons have been triggered, and wherein the performing is further based on:

receiving activity information for the user; and determining, based on the activity information and the at least two alerting beacons, that the two alerting beacons indicate malicious activity.

11. The method of claim 10, wherein the activity information indicates execution of at least one of the following discovery commands: whoami, id, uname, /etc/passwd, and sudo.

12. The method of claim 9, further comprising:

logging, by the computer system based on the receiving, activity of the user relative to the computer network; and training, by the computer system based on the logged activity, a machine learning module, wherein the trained machine learning module is usable to detect malicious activity of one or more users within the computer network.

13. The method of claim 9, wherein a fake fingerprint included in at least one of the plurality of executable binaries identifies a file associated with a type of permission that allows users to execute files with elevated access rights.

14. The method of claim 9, wherein performing the set of preventative actions includes:

blocking data exfiltration for the user, wherein the blocking is performed without the notifying the user.

15. The method of claim 9, wherein performing the set of preventative actions includes:

increasing logging of activity of the user relative to the computer network, wherein logging activity of the user is performed by capturing a plurality of artifacts prior to the user clearing their activity history.

16. The method of claim 15, further comprising:

blocking, by the computer system, the user from the computer network, wherein the blocking is performed based on an amount of logged user activity satisfying an activity threshold;

deleting, by the computer system, one or more of the plurality of executable binaries; and updating, by the computer system, a plurality of credentials for the computer network.

17. A non-transitory computer-readable medium having instruction stored thereon that are executable by a server computer system to perform operations comprising:

receiving a plurality of executable binaries that include alerting beacons for a computer network associated with a transaction service;

deploying, within the computer network, a plurality of executable binaries as traps to detect privilege escalation attempts within the computer network;

detecting that one or more alerting beacons included in the plurality of executable binaries have been triggered, wherein respective ones of the plurality of executable binaries carry fake fingerprints that identify vulnerable resources of the computer network that are usable as part of a privilege escalation attack; and in response to the detecting transmitting a notification to a security management system indicating the one or more triggered alerting beacons, wherein the alerting beacons are for the computer network;

wherein a security management system performs, based on receiving the notification, a set of preventative actions without notifying a user that triggered the one or more of the alerting beacons.

18. The non-transitory computer-readable medium of claim 17, wherein the operations further comprise:

prior to the detecting, logging activity of one or more users relative to the computer network;

performing a pattern analysis of the logged activity; and training, based on results of the pattern analysis, a machine learning module, wherein the trained machine learning module is usable to predict prior to an alerting beacon being triggered whether activity of one or more users is malicious.

19. The non-transitory computer-readable medium of claim 18, wherein a fake fingerprint carried by at least one of the plurality of executable binaries identifies a service that is stored in a location that is accessed during one or more banner grabbing operations.

20. The non-transitory computer-readable medium of claim 18, wherein a fake fingerprint carried by at least one of the plurality of executable binaries identifies a service that is associated with misconfigured access privileges, wherein the service is executable by users that do not have access privileges of a root account.

* * * * *